United States Patent Office 3,321,767
Patented May 23, 1967

3,321,767
AUTOMATIC LOGGING SYSTEM
Salvatore A. Fulchino, 146 Hancock St.,
Everett, Mass. 02149
Filed Jan. 11, 1965, Ser. No. 424,604
3 Claims. (Cl. 346—34)

This invention relates to automatic logging systems for monitoring a plurality of simultaneously occurring information signals and more particularly to an improved automatic logging system wherein each of the plurality of information signals is effectively logged on a single continuously running chart.

Under many circumstances it becomes desirable to chart or log a plurality of simultaneously occurring electrical information signals. For example, in the case of radio and television stations the Federal Communications Comimssion requires monitoring transmitter performance by the periodic checking of such transmitter operating parameters as output frequency, power output, plate voltage and plate current.

To minimize the time consuming and expensive operation of manual monitoring of these parameters, it has become customary to provide a separate chart recorder for each of the electrical information signals. While the result has been to reduce the amount of manual effort and time required, nevertheless, the number of separate charts so created still require the undesirable expense of multiple recorders as well as teduious and burdensome replacement, storage and filing problems due to the multiplicity of separate charts.

These problems have been overcome by the present invention which also incorporates other desirable features and advantages. Among these other desirable features and advantages is the provision of an automatic logging system for a plurality of simultaneously occurring information signals which has only a relatively small number of working parts and is substantially less expensive to manufacture than devices of this class heretofore in use. Another advantage is that of achieving the logging of all of the information signals by a single chart recorder. A further feature and advantage is that of simplifying identification and reading of the various charted information signals by dividing the chart into separate parallel channels or strips with each individual parameter being recorded in a separate one of these parallel channels. Other features and advantages include the provision of automatic identifying illumination of each information signal channel during the exact period in which the associated information signal is being recorded to thereby insure ease in equipment operation and signal identification; also, the provision of an arrangement for permitting manual indexing to any desired channel and maintaining a continuous recording on a single selected channel as for purposes of calibration or concentration on the monitoring of a single parameter; additionally the provision of adjusting potentiometers in association with channel identification lights for facilitating calibration and channel parameter setting.

A primary object of the present invention is the provision of an automatic logging system for providing substantially continuous recording on a single chart of a plurality of simultaneously occurring information signals.

Another object is the provision of an automatic logging system which achieves substantially continuous recording of a plurality of information signals on a single chart with each of the information signals being in a separate non-overlapping strip or channel on the chart.

And a further object is the provision of an automatic logging system for sequential recording of each of a plurality of simultaneously occurring information signals, each information signal being recorded in a separate channel on the chart of the recorder.

And a still further object is the provision of an automatic logging system for repetitive sequential recording of each of a plurality of simultaneously occurring information signals with automatic sequential illumination of corresponding stations identifying the particular information signal being recorded at any given instant.

Further objects include the provision of an automatic logging system for repetitive sequential recording of each of a plurality of information signals with capacity for manual indexing to any one of the plurality of signals, as well as capacity for maintaining a continuous recording of a single selected information signal, and the provision of structure for adjusting base and range of identifying signal intensity positioned adjacent the associated station identifying illuminator for facilitating calibration and adjustment at each station position.

And other objects include the provision of an automatic logging system for sequential recording of each of a plurality of information signals which has relatively few working parts, is relatively simple annd inexpensive to manufacture and rugged in construction and reliable in operation.

These objects, features and advantages are achieved generally by the provision of a strip chart recorder of the type having a moving chart, a meter with an indicator arm at the chart, a striker cooperating with the arm to cause the indicator arm to form intermittent mark impressions on the chart, a stepper switch arrangement having a plurality of information signal channels with each channel adapted for receiving a respective one of the plurality of information signals, an indexing structure for sequentially coupling individual ones of the channels to the meter for recording of the associated information signal, and a timer in control relation to the striker and indexing structure for causing the striker to effect the mark impression after completion of each of the sequential couplings.

By providing for rapid actuation of the striker and corresponding moderate speed of the chart, each mark impression will desirably appear in substantially the form of a dot on the chart.

By providing a suitably rapid sequential indexing, each of the plurality of information signals may be sequentially monitored to appear as substantially continuous lines on the chart, each representing the information signal in the associated information signal channel.

By including the timing arrangement a rotating cam with striker follower engaging the cam and coupling to actuate the striker under control of the cam, and by providing an electric switch follower engaging the cam and coupled to actuate the indexing structure under control of the cam, a relatively simple and effective arrangement for coordinating sequential indexing and recording is thereby achieved.

By providing in each of the channels an arrangement for setting the characteristic intensity range of the information signal in the respective channel at a value to record in a corresponding distinctive strip or channel on the chart, desirable ease in identification of the recorded parameters is thereby achieved.

By providing a plurality of electric lamps with one lamp corresponding to each of the channels and coupling the lamps to the stepper switch arrangement for sequential lighting of respective ones of the lamps simultaneously with the coupling of the corresponding information signal channel to the meter, additional ease in identifying and checking parameters being monitored is thereby achieved.

By placing the signal intensity range adjustment for each channel in manually accessible position at each associated channel lamp, ease in calibrating and adjusting the respective channels is thereby achieved.

By providing the timing cam in the form of a rotating disc having alternate peripheral lands and notches with each land and notch proportioned for relative time engagement by the striker follower to actuate the striker in manner to depress the indicator arm against the chart each time the striker follower engages a notch and to release the indicating arm during engagement of a land by the striker follower, and engagement by the switch follower to actuate the indexing structure in manner to cause the sequential coupling of the next information signal channel to the meter when the switch follower engages a notch, and positioning the switch follower to engage a notch only when the striker follower has been on a land of the cam a sufficient period for substantial subsiding of transient signals, desirably stabilized operation is thereby achieved.

By providing a separate manually closable power circuit for energizing the stepper switch each time the circuit is closed, manual indexing to any selected channel as well as capacity for continuous operation at such selected channel is thereby achieved.

These and other features, objects and advantages of the invention will become more apparent from the following description taken in connection with the accompanying drawings of a preferred embodiment of the invention and wherein.

Figure 1:
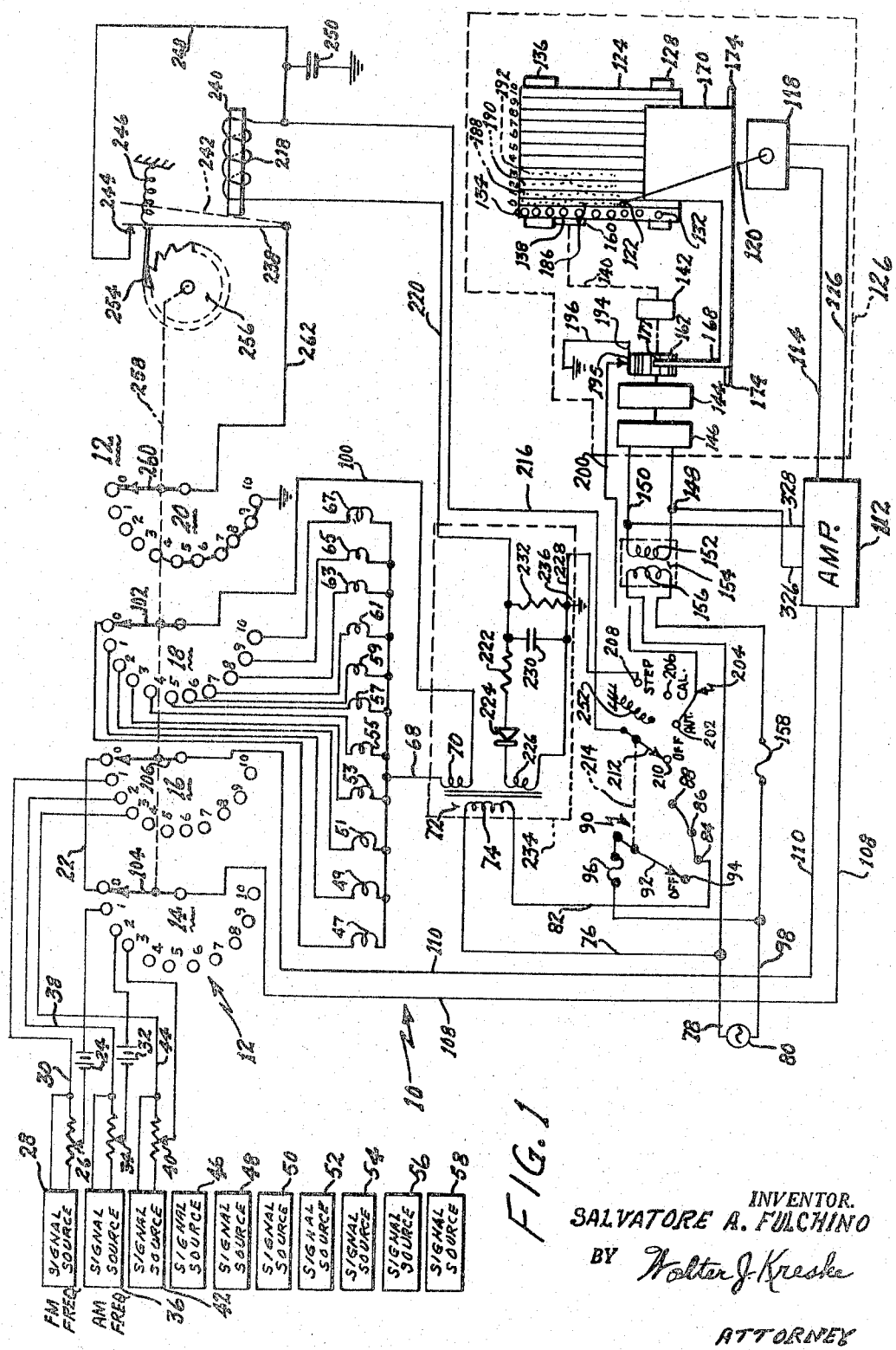
FIG. 1 is a partially schematic and partially block diagram of the overall construction of the preferred embodiment of the invention.

Referring to FIG. 1 in more detail, an automatic signal logging system for monitoring a plurality of information signals in accordance with the present invention is designated generally by the numeral 10. The automatic logging system 10 has a stepper switch 12 having 4 banks 14, 16, 18 and 20 of terminals. In the present instance there are eleven terminals numbered 0 through 10 in each bank. The terminals numbered 0 in terminal banks 14 and 16 are coupled together by an electric cable 22. Terminal 1 in terminal bank 14 is coupled through a power source 24 such as a battery and a wiper arm and resistor of an adjustable potentiometer 26 to one terminal of a signal source 28 such as a carrier frequency monitor of the type generally found in commercial MF or TV broadcast stations, the other side of which is coupled through an electric cable 30 to terminal 1 of the terminal bank 16.

In similar manner, terminal 2 of the terminal bank 14 is coupled through a power source 32 such as a battery and through a wiper arm and resistor of a potentiometer 34 to one side of a signal source 36 such as a carrier frequency monitor of the type generally found in commercial AM broadcast stations, the other side of which is connected through an electric cable 38 to terminal 2 in terminal bank 16.

Terminal 3 of terminal bank 14 is coupled through a wiper arm and resistor of a potentiometer 40 to one side of a signal source 42 such as a resistor in series with a plate current circuit, or a resistor in a meter multiplier chain in a high voltage measuring circuit, both being common in broadcast transmitters, the other side of which is coupled through an electric cable 44 to terminal 3 of the terminal bank 16. It will be noted that no power source such as battery 32 was required in the instance of signal source 42 because signals from such source varies in a single direction only and therefore may be adjusted in intensity directly on potentiometer 40 as will be hereinafter further described.

In like manner signal sources 46, 48, 50, 52, 54, 56, and 58 may be coupled to the terminals 5, 6, 7, 8, 9, 10 and 11, respectively, of each of the terminal banks 14 and 16 of the stepper switch 12. It will be noted that such coupling may include power sources such as batteries 24 and 32 depending upon whether they vary in a single direction from a reference base as explained above.

The terminals 0 through 10 of terminal bank 18 are each coupled to one side of electric indicator lamps 47, 49, 51, 53, 55, 57, 59, 61, 63, 65 and 67, respectively, the other side of each of which is coupled through an electric cable 68 to one side of a secondary 70 of a power transformer 72 having a primary 74. The primary 74 has one side coupled through electric cables 76 and 78 to one terminal of an alternating current power source 80 which may be a conventional 60-cycle, 110-volt alternating current power source. The other side of the power transformer primary 74 is coupled through an electric cable 82 to terminals 84, 86 and 88 of a power supply switch 90 having a moveable contact arm 92 which as shown in FIG. 1 has its moveable contact arm on power OFF terminal 94 of the power supply switch 90. The contact arm 92 is also coupled through a fuse 96 and electric cable 98 to the other side of the alternating current power source 80.

The other side of the power transformer secondary 70 is coupled through an electric cable 100 to the pivotal end of a moveable contact arm 102 in the terminal bank 18 of the stepper switch 12 for selectively engaging terminals 0 through 10 in the terminal bank 18 as will be hereinafter further described.

The terminal bank 20, in the present instance, has its terminals 4 through 10 coupled to ground to provide for operation of the logging system 10 as a 4 channel information signal system wherein besides the zero reference of terminals 0, only information signal sources 28, 36 and 42 are used. If more or less of the information signal sources are used, the number of grounded terminals in terminal bank 20 would be accordingly changed as will become apparent from the following description.

The terminal banks 14 and 16 have moveable contact arms 104 and 106, respectively, to make electrical contact with respective ones of the terminals 0 through 10 and are coupled through electric cables 108 and 110, respectively, to the input of a signal amplifier circuit 112, a suitable circuit for which is described in connection with FIG. 3. The output of the signal amplifier 112 is coupled through electric cables 114 and 116 to the input side of an electric meter 118 having an indicator arm 120 pivotally mounted at the meter 118. The other end of the indicator arm 120 is in the form of a pointed stylus 122 at a strip chart 124 of a chart recorder 126. The chart recorder 126 is preferably of the intermittant recording type such as that commercially known as Rustrak, currently manufactured by the Rustrak Instrument Company, Manchester, N.H.

The chart 124 may be carried from a supply roll 128 over a plate or hard surface 130 (FIG. 2) forming a support base for the chart 124 when struck by the stylus 122 as will be hereinafter further described. Chart 124 may have evenly spaced holes 132 along one edge engaging drive pins 134 of a synchronous drive sprocket on one side of a driving drum 136 onto a receiving roll 138. The driving drum 136 is rotated through a mechanical connection 140 of a suitable gear train 142 driven by another gear train 144 operating from a synchronous motor 146 which receives its electric power through electric cables 148 and 150 coupled to a secondary 152 of a constant voltage transformer 154. The transformer 154 has a primary 156 coupled at one end through the electric cable 78 and at the other end through a fuse 158 and electric cable 98 across the alternating current power source 80.

The receiving roll 138 is preferably driven through a slipping clutch 160 at a somewhat faster peripheral speed than the driving drum 136 so as to insure continuous windup tension on the strip chart 124. The chart recorder 126 also has a rotating cam 162 which may be in the form of a disc carrying evenly spaced notches 164 separating a plurality of substantially equal arcuate lands 166. As an example of suitable speeds, the exemplary cam 162 is two inches in diameter, has fifteen notches 164 and lands 166 and is driven at a rotational speed of one revolution per minute with the chart 124 preferably traveling at a speed of ½ inch per hour.

Figure 2:
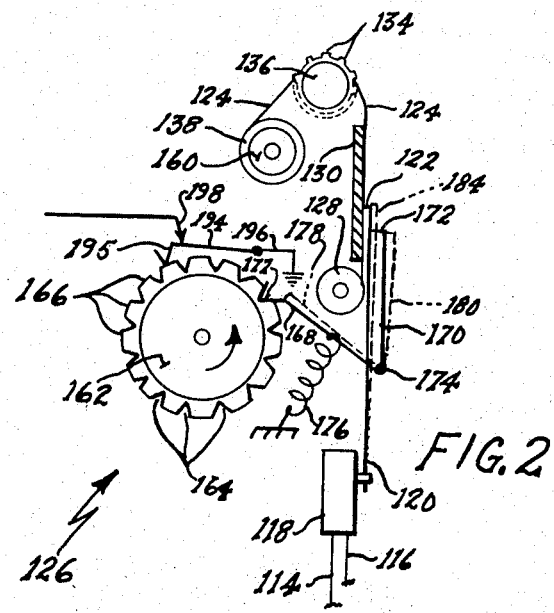
FIG. 2 is a schematic side view diagram of a portion of the FIG. 1 structure to more clearly show construction and operation of the invention.

The periphery of the camming disc 162 carries a striker follower 168 fixed to a striker plate 170, the upper end of which is bent to form a striker lip 172 (FIG. 2) and the lower end of which has a pivotal mounting 174. A tension spring 176 is anchored at one end and at the other end fixed to the striker follower 168 so that when the striker follower V formation 177 engages a notch 164 of the cam 162 as shown in FIG. 2, spring 176 draws the striker follower 168 downwardly about pivot 174, thereby causing striker lip 172 to force the indicator arm stylus 122 against the chart 124 so as to create on the chart 124 a mark impression of the indicator arm stylus 122. When the V formation 177 at the end of the striker follower 168 rides on a land 166, the follower 168 is moved upwardly to the position shown by the broken lines 178 so as to cause the striker lip 172 and striker plate 170 to pivot away from the indicator arm 120 as shown by the broken line 180 in FIG. 2, permitting the stylus 122 of the indicator arm 120 to be released from contact with the chart 124, as shown by the broken lines 184.

Thus, it is seen that when moveable contact arms 104 and 106 are on terminals 0 of terminal banks 14 and 16 respectively as shown in FIG. 1, the short circuiting cable 122 will result in no signal reaching the amplifier 112 and thereby the indicator arm 120 will be in the zero reference position shown in FIG. 1 which position will be recorded by stylus 122 as the zero reference position of the indicator arm 120 each time the striker follower 168 engages a notch 164 in the periphery of the cam 162 and will appear in channel numbered 0 on chart 124 as substantially a dot 186.

When moveable contact arms 104 and 106 are moved to terminals 1 of terminal banks 14 and 16, the output of signal source 128 will thereby appear through electric cables 108 and 110 at the amplifier 112, the output of which will appear through cables 114 and 116 at the meter 118. In this instance, as explained above, the signal source 28 being the representative signal of a frequency modulation carrier signal, the base voltage battery 24 is provided to insure that the signals from the source 28 will be recorded as dots 188 only in the channel numbered 1 on the chart 124.

Likewise when the moveable contact arms 104 and 106 are on terminals 2 of the respective terminal banks 14 and 16, the signal from the information signal source 36 which in this instance may be representative of an amplitude modulation frequency signal which with the battery 32 providing the base voltage, will record as dots 190 only in channel numbered 2 on the chart 124.

When the moveable contact arms 104 and 106 are on terminals 3 of the respective terminal banks 14 and 16, the potentiometer 40 is adjusted to provide for the information signal from the signal source 42 to appear as dots 192 in the channel or strip numbered 3 on the chart 124. It will be noted that in the instance of signal source 42 being a single directional signal such as plate voltage, no auxiliary basing voltage source such as batteries 32 and 24 are needed, and the potentiometer 40 itself is sufficient to make the proper base voltage adjustment to confine recording to that of the strip 3 on the chart recorder 124.

The cam 162 also carries an indexing switch follower 194 which is coupled to ground 196 and the follower V formation 195 (FIGS. 1 and 2) is arranged in a position such that when it rides on a land 166, it makes electrical engagement with a terminal 198 which is coupled through an electric cable 200 to an automatic operation terminal 202, labeled AUT, in an operation selector switch 204 which also has a calibrate terminal 206, labeled CAL, a manual step terminal 208, labeled STEP, an off terminal 210, labeled OFF, and a moveable switch arm 212 tied by a linkage 214 to switch arm 92 of the power switch 90 to operate simultaneously therewith. Thus, when the moveable arm 212 of the operation selector switch 204 is engaging the OFF terminal 210, the moveable arm 92 of the power switch 90 will likewise be engaging the OFF terminal 94 of the power switch 90 as shown in FIG. 1. Similarly, when the moveable switch arm 212 is on AUT terminal 202, the moveable power switch arm 92 will be on terminal 84. When the moveable switch arm 212 is on the calibrate terminal 206, the moveable power switch arm 92 will be on the terminal 86, and when the moveable switch arm 212 is on the manual STEP terminal 208, the moveable power switch arm 92 will be on the terminal 88.

The moveable operation selector switch arm 212 is coupled through an electrode cable 216 to one side of a stepper switch motor solenoid 218, the other side of which is coupled through an electric cable 220, a resistor 222, a unidirectional current source 224, such as a rectifier, to one side of a secondary 226 of the power transformer 72, the other side of which is coupled through a cable 228 to the manual STEP terminal 208. A smoothing capacitor 230 and load resistor 232 are coupled across the electric cables 220 and 228 to form with the resistor 222, rectifier 224, secondary 226 of transformer 72 a direct current power supply 234. Electric cable 228 is coupled to ground 236.

Thus, when the operation selector movable switch arm 212 is manually pushed to the STEP terminal 208, the direct current power supply 234 will energize the stepper switch motor solenoid 218 so as to cause the relay armature 238 to be pulled against a magnetic core 240 of the solenoid 218 as shown by the broken line 242. Such movement causes one end of the stepper relay arm 138 to disengage from a stepper relay terminal 244 and compress a stepper relay indexing spring 246. The stepper relay terminal 244 is coupled through an electric cable 248 to the electric cable 216 and through a bypass capacitor 250 to ground. A disengaging spring 252 in the operation selector switch 204 is compressed when the movable switch arm 212 is moved to the STEP terminal 208. Thereby, when the movable switch arm 212 is manually released the disengaging spring 252 will cause the movable switch arm 212 to disengage from the STEP terminal 208 and to engage the calibrate terminal 206. Thus, the circuit from the power supply 234 to the stepper relay solenoid 218 will be opened and thereby cause the solenoid 218 to be de-energized. Thereupon, the compressed stepper relay indexing spring 246 will force the stepper relay arm 238 outwardly away from the stepper relay solenoid 218 so that ratchet arm 254 causes the stepper relay indexing cam 256 which is coupled by a mechanical linkage 258 to movable contact arm 260 in terminal bank 20 and movable contact arms 102, 106 and 104 in the stepper switch terminal banks 18, 16 and 14 respectively, to the next adjacent terminal of the respective banks which in the present instance is terminal numbered 1.

It will be noted that the movable contact arm 260 in the stepper switch bank 20 is coupled by an electric cable 262 to the relay armature 238. Thus when the operation selector movable contact arm 212 of the operation selector switch 204 is on the automatic operation terminal 202, the cable 216 may be alternatively coupled to the cable 228 of the direct current power supply 234 through terminal 198, indexing switch follower 94, ground 96, and ground 236, or through cable 248, terminal 244, movable relay arm 238, cable 262, movable contact arm 260 and any one of the grounded terminals 4 through 10 in the terminal bank 20. Thus, whenever the movable arm 260 reaches the terminal 4, the stepper relay 218 will be intermittently energized to bring the movable stepper switch arms 260, 102, 106 and 104 back to the terminal numbered 0 in each of the terminal banks 20, 18, 16 and 14 respectively.

*Operation*

In the operation of the automatic logging system 10, it will be noted that when the power switch 90 and operation selector switch 204 have their movable arms 92 and 212 on the OFF terminals 94 and 210 respectively, no power from power source 80 can reach the stepper switch 12 and thereby the stepper switch 12 will be dormant. Nevertheless, in the present instance, power from the alternating current power source 80 is applied through electric cables 78 and 98, transformer 154 and electric cables 148 and 150 to the synchronous motor 146 of the chart recorder 126 to cause, through gear trains 144 and 142, the continuous operation of the chart recorder 126. During such continuous operation of the chart recorder 126 and dormancy of stepper switch 12, as explained above, if stepper switch 12 is left with its movable contact arms 102, 104, 106 and 260 on terminals numbered 0 in the respective terminal banks, because of the shorting cable 22 across terminals 0 of the terminal banks 14 and 16, no signal will appear at the amplifier 112 nor meter 118 and the indicator arm 120 will continue to be recorded at the zero reference position in the channel or strip numbered 0 on the chart 124 as broken line mark impression 186.

While in the present instance such continuous chart recorder 126 operation is desirable for indicating a shut down condition of the radio transmitter being monitored, if desired a switch may be inserted in lines 78 and 98 for those instances where the chart 124 movement is also desired to be dormant when the stepper switch 12 is dormant.

The logging system 10 may be placed in automatic operation by moving the movable switch arm 92 of the power supply switch 90 to the terminal 94 and the movable switch arm 212 of the operations selector switch 204 to the AUT terminal 202. Thereupon, electric power cable 98 from one side of the power source 80 is coupled through fuse 96, movable switch arm 92, terminal 84, electric cable 82, primary 74 of the power transformer 72, electric cables 76 and 78 to the other side of the alternating current power source 80. Thereby, the transformer 72 becomes operative so as to energize the secondary 226 of the direct current power supply 234 which with its smoothing capacitor 230 and load resistor 232 provide a direct potential output across the electric cables 220 and 228. Thus, when a land 166 of the indexing cam 162 causes the indexing switch follower 194 to engage the indexing terminal 198, the circuit from ground 236 of the power supply 234 is completed through ground terminal 196, indexing switch follower 194, indexing terminal 198, electric cable 200, AUT terminal 202, movable switch arm 212, electric cable 216, stepper relay motor solenoid 218, electric cable 220 to the other side of the direct current power source 234. Thereby, the movable stepper relay armature 238 is attracted to the magnetic core 240 to the position shown by broken lines 242 with its upper end compressing the stepper relay indexing spring 246 and carrying ratchet arm 254 to the next adjacent ratchet on the stepper relay indexing cam 256. The stepper relay armature 238 will remain in this cocked position shown by the broken line 242 so long as the indexing switch follower V formation 195 remains on a land 166. When the follower V formation 195 again falls into a notch 164, the circuit at the indexing terminal 198 is broken so as to de-energize the stepper motor solenoid 218 and thereby de-energize the magnetized core 240 so as to allow the stepper relay armature 238 to be pushed back by the compressed relay spring 246 to the normal position against the stepper relay terminal 244 shown in FIG. 1. The ratchet arm 254 thereby indexes the stepper relay indexing cam 256 forward one notch, which action is transmitted through mechanical linkage 258 to the movable contact arms 260, 102, 106 and 104 so that each will simultaneously advance to the next higher numbered terminal in the terminal banks 20, 18, 16 and 14, respectively, which in the illustration shown in FIG. 1 would be the terminals numbered 1 in each of said terminal banks.

However, prior to the indexing switch follower V formation 195 falling into a notch 164 of the rotating cam 162, the striker follower 168 has its V formation 177 arranged to fall into a notch 164 so that the striker follower arm 168 moves suddenly from the broken line position 178 (FIG. 2) forwardly to the position shown by the solid line 168, thereby carrying the striker plate 170 from the broken line position 180 forwardly against the indicator arm 120 so as to cause the point of the stylus 122 to strike the chart 124 which is supported at the point of impact by support plate 130. The point of the stylus 122 thereby makes a mark impression on the chart 124 commensurate with the information signal reaching the electric meter 118 through lines 114 and 116 from a pair of terminals at the information signal terminal banks 14 and 16 determined by the index position of the moveable contact arms 104 and 106, respectively, as explained above.

The follower V formation 195 of the indexing switch arm 194 is preferably arranged with respect to the striker follower V formation 177 in position such that the indexing following V formation 195 has dwelled on a land 166 to allow transient currents in the circuit system to subside before the striker follower V formation falls into a notch 164. The preferable timing arrangement is to prevent current fluctuations and oscillations caused by an immediately previous indexing movement from affecting the accuracy of position of the stylus 122 mark impression on the chart 124. As shown in FIG. 2, the indexing follower V formation 195 has nearly completed its travel on the land 166 before the striker follower V formation falls into a notch 164, an arrangement in the present embodiment which has been found to provide sufficient stabilization time between sequential indexing operations. However, it should be understood that the particular configuration used to provide adequate stabilization will depend upon such factors as the speed of the indexing cam 162 and physical parameters of the particular circuits used.

Thus, in the above mentioned automatic operation mode of the automatic signal logging system 10, each time the indexing switch follower V formation 195 falls into a notch 164 of the rotating cam 162, the moveable contact arms 104, 106, 102 and 260 will advance to the next higher numbered terminal on the respective terminal banks 14, 16, 18 and 20. Also, the associated information signal will be recorded on the chart 124 by the stylus 122 which is activated in each instance by the striker follower V formation 177 being pulled into a notch 164 by the striker follower spring 176. This sequential recording operation for the embodiment shown in FIG. 1 will occur as follows:

When the moveable switch arms 104, and 106 are on terminals numbered 0 which are short circuited by electric cable 22, there will be no information signal reaching the meter 118. Thereby, the meter 118 will cause stylus 122 to record in the zero reference channel identified by the numeral 0 on the chart 124. When the moveable switch arms 104 and 106 are indexed to the terminals numbered 1, a direct current power source such as battery 24 together with adjustment on potentiometer 26 insures that information signals reaching the meter 118 will be recorded in the channel numbered 1 on the chart 124. As previously mentioned, such battery 24 as a supplementary voltage source is used when the information signal at the source 28 is of the type which may vary in both a positive and a negative directions such as a frequency modulation radio frequency signal converted to a corresponding signal by a suitable transducer at signal source 28.

Similarly, when the moveable contact arms 104 and 106 are on terminals 2, a battery 32 and potentiometer 34 are selected and adjusted to insure that the information signal reaching the electric meter 118 will be recorded in channel 2 on the chart 124. In this instance an amplitude modulation radio frequency signal is converted to a corresponding signal by a suitable transducer at the information signal source 36, and the battery 32 is used to augment information signal voltage to insure recording in channel 2 on the chart 124.

Other information signal sources may be for voltages, currents or power. If, for example, the source 42 is for a plate voltage at the transmitter, a supplementary battery as 32 is not needed and the potentiometer 40 alone is sufficient to insure adjustment of output information signal from terminals 3 through moveable contact arms 104 and 106 at the electric meter 118 will be recorded in the channel numbered 3 or the chart 124. In similar manner the remaining information signal sources 46, 48, 50, 52, 54, 56 and 58 while for purposes of simplicity of illustration are not shown coupled to their corresponding terminals 4, 5, 6, 7, 8, 9 and 10 in the terminal banks 14 and 16, they may be coupled to said terminals in manner similar to that described with respect to information signal sources 28, 36 and 42 above, and may have similar potentiometers, batteries or other auxiliary components to insure recording in associated separate channels on the chart 124 when moveable contact arms 104 and 106 reach the corresponding terminals in the terminal banks 14 and 16. However, it will be noted that in the present instance where only terminals 0 through 3 in the terminal banks 14 and 16 are used, terminal bank 20 has for purposes of illustration grounded the remaining terminals numbered 4 through 10. Thus when the moveable contact arm 260 reaches the terminal 4, the circuit from the direct current power source 234 through electric cable 220 and solenoid 218 will be completed through cable 248, terminal 244, stepper relay armature 238, cable 262, moveable contact arm 260, terminal 4 to ground terminal 236 of the power supply 234. Thereby the stepper switch motor solenoid 218 is energized so as to draw the stepper relay arm 238 against the magnetized core 240, compressing the stepper relay indexing spring 246 and breaking the circuit again at the stepper relay terminal 244 so as to again de-energize the stepper switch motor solenoid 218. This allows the compressed spring 246 to move the relay arm 238 with its ratchet arm 254 forward to index the stepper indexing cam 256 to the next position which simultaneously carries the moveable contact arms 260, 102, 106, and 104 to terminal 5 whereupon the circuit is again closed at the stepper relay terminal 244 to repeat the indexing cycle. Such repetitive indexing continues also for terminals 6, 7, 8, 9, 10 and back to 0 in rapid succession. At the terminal 0 of the moveable contact arms 260, 102, 106 and 104 the indexing cam 162 again controls indexing as explained above.

This repetitive indexing and recording of the information signals from sources 28, 36 and 42 in channels 0, 1, 2 and 3 on chart 124 and recycling will continue so long as the operation selector switch arm 212 is on the automatic terminal 202. During such operation, the by-pass capacitor 250 has the function of by-passing spurious alternating components caused by the indexing from circuit to circuit by stepper switch 12.

It should be noted that the moveable contact arm 102 in the terminal bank 18 moves in synchronism with the other contact arms in terminal banks 20, 16 and 14 and completes an illumination circuit in corresponding sequence through indicator lamps 47, 49, 51, 53, 55, 57, 59, 61, 63, 65 and 67 respectively as the moveable contact arm 102 engages terminals 0 through 10 in the terminal bank 18. Thus, in the position shown in FIG. 1, the circuit is completed by moveable contact arm 102, terminal 0, the indicator lamp 47, cable 68, transformer secondary 70 and electric cable 100 to cause illumination of the lamp 47 as identification of moveable contact arms 260, 102, 106 and 104 being on the respective terminals numbered 0. Thereby, at all times there is a visual indication of the particular channel on the chart 124 wherein recording is taking place.

When it is desired to work on or calibrate the circuit of a particular information signal source, the automatic sequencing may be stopped and continuous recording of a single information signal source may be retained by moving the operation selector switch arm 212 of the operations selector switch 204 to the CAL terminal 206. Thereupon, the stepper switch motor solenoid 218 can no longer be energized under control of the rotating cam 162 which nevertheless continues to rotate and cause recording on chart 124 of information signals coming from a particular set of terminals in the information signal terminal banks 14 and 16 which happened to be engaged by contact arms 104 and 106 when the stepper switch motor solenoid became energized.

When it is desired to index to a next higher terminal in the terminal banks 14, 16, 18 and 20, the operations selector switch arm 212 may be momentarily pressed against the STEP terminal 208, whereupon the circuit is completed from cable 228 through selector switch arm 212, STEP terminal 208, electric cable 216, solenoid 218 and return line 220. This causes the solenoid 218 to be energized. A spring 252 is provided in the operations selector switch 204 in manner to press against the operations selector switch arm 212 when it touches the STEP terminal 208 so as to cause its rapid movement back to the CAL terminal 206 for continuous recording of the newly indexed information signal channel caused by again de-energizing the stepper motor solenoid 218.

Figure 3:
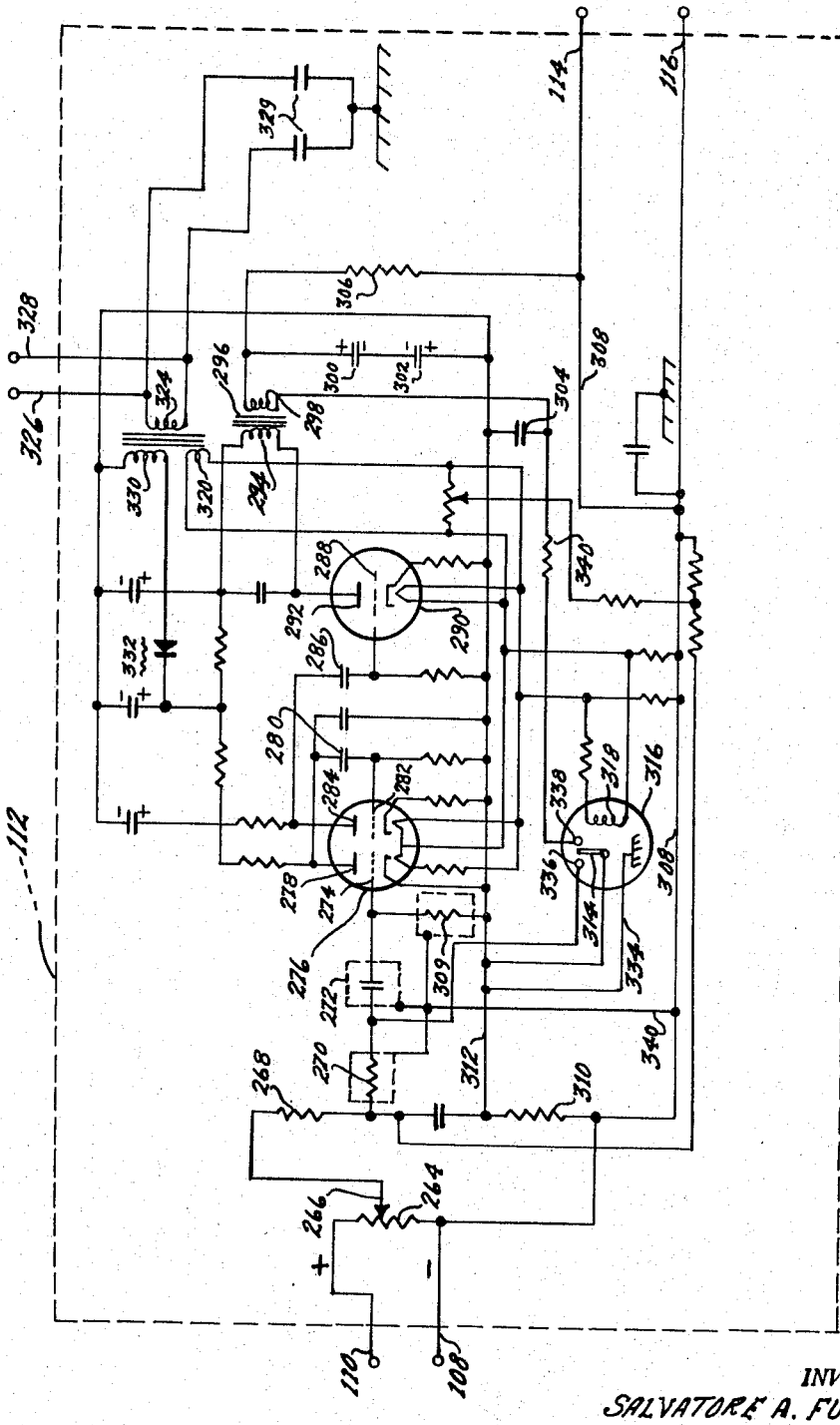
FIG. 3 is a schematic diagram of an amplifier circuit suitable for use as the amplifier shown in block form in the FIG. 1 embodiment.

Referring to FIG. 3 in more detail, therein is presented a schematic diagram of an amplifier circuit suitable for use as the amplifier 112 in the embodiment shown in FIG. 1. In the FIG. 3 illustration of the amplifier 112, the input lines 110 and 108 are coupled across a calibration potentiometer 264 having an adjustable contact arm 266 coupled through a resistor 268, a shielded resistor 270 and shielded capacitor 272 to a grid 274 of a single envelope double triode 276. A plate 278 associated with the grid 274 is coupled through a capacitor 280 to a second grid 282 having associated therewith a plate 284 coupled through a capacitor 286 to a grid 288 of an amplifier triode 290 having a plate 292 coupled to a primary 294 of an output transformer 296. The transformer 296 has a secondary 298 across which are coupled smoothing or ripple filter capacitors 300, 302 and 304. Also, one side of the secondary 298 is coupled through a resistor 306 to output line 114 and through feedback lines 308 and 340 to the shielded resistors 270, 309 and shielded capacitor 272 at the control grid 274 of the single envelope double triode 276.

Input signal ground line 108 is coupled to the feedback line 308 and through a resistor 310 to input signal ground line 312. The signal ground line 312 is coupled to a moveable armature 314 of a synchronous vibrator chopper 316. The synchronous vibrator chopper 316 has an energizing solenoid 318 coupled to a secondary 320 of a power transformer 322 having a primary 324 coupled through electric power cables 326 and 328 to the alternating current power cables 148 and 150 respectively. The power transformer 322 also has a secondary 330 in a filter circuit 332 for providing the operating voltage for the single envelope double triode 276 and amplifier 290. By-pass grounding capacitors 329 are also coupled to the electric power cables 326 and 328 to by-pass undesired frequency signals which may be present on electric cables 326 and 328.

Signal ground line 312 is also coupled through line 334 to ground in the chopper 316. The vibrator arm 314 of the synchronous chopper 316 is moveable between a terminal 336 coupled through the shielded capacitor 272 to control grid 274 of the triode 276 and a terminal 338 coupled through a resistor 340 to one side of the secondary 298 of the output transformer 296.

The amplifier 112 thereby becomes a chopper stabilized amplifier wherein the 60 cycle signal from the power transformer secondary 320 moves the moveable chopper armature 314 at the sixty cycle rate between terminals 336 and 338 to alternately ground and thereby chop the input signal from line 110 to make the amplifier 112 operate as a chopper stabilized amplifier. The alternating signal from the amplifier 290 across the output transformer 296 is reconverted to a direct voltage signal by means of the filter capacitors 300 and 302, thereby producing a direct current output information signal across lines 114 and 116 to the meter 118 for recording as explained above. The output signal is also fed back through feedback lines 308 and 342 to the shielded resistor 270 and shielded capacitor 272 as an automatic gain control arrangement.

Figure 4:
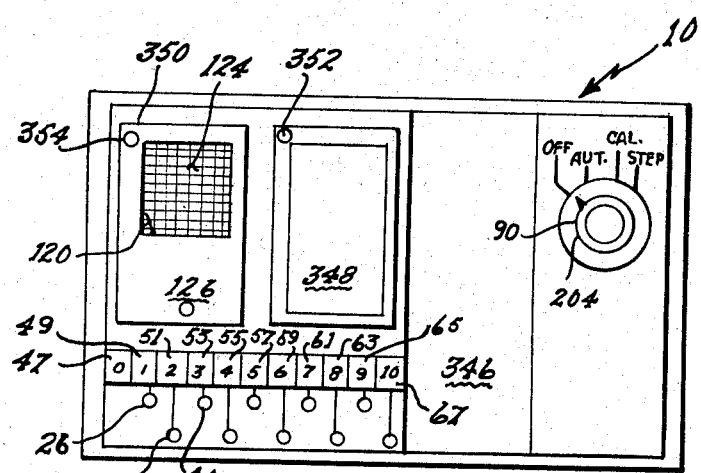
FIG. 4 is a front view of a panel carrying the FIG. 1 embodiment to more clearly show construction and operation thereof.

Referring to FIG. 4 in more detail wherein is shown a particularly desirable arrangement of components of the FIG. 1 embodiment mounted on the front side of a panel 346 and identified by numbers corresponding to identically numbered components in the FIG. 1 schematic illustration. The panel 346 may be of a size to fit in conventional racks used for mounting equipment such as found at radio and television stations, or it may be the front wall of a suitable container carrying the remaining components of the FIG. 1 embodiment.

It will be noted that the indicator lights 47 through 67 may include translucent covers numbered 0 through 10 to correspond with the above mentioned stepper switch bank terminals 0 to 10 for rapid and convenient identification of the channel being monitored at any instant of time. It should also be noted that beneath each of the lights 49 through 67 is an identifying marker line to an associated clearance hole for insertion of an instrument such as a screwdriver for rapid and convenient adjustment of an associated potentiometer resistor such as the potentiometer resistors 26, 34 and 40 at the indicator lights 49, 51 and 53 respectively.

Additionally, the chopper stabilized amplifier 112 is mounted in a housing 348 which may be similar in shape to housing 350 of the chart recorder 126 and held in place by thumb screws 352 and 354, respectively, which are removeable for providing ready accessibility to the mounted components for servicing.

Only the control knob of the power and operation selector switches 90 and 204, respectively, need be manually accessible at the front of the panel 346 and may be in the form of a rotary gang switch manually operable by the control knob shown in FIG. 4.

This invention is not limited to the particular details of construction and operation described herein, as equivalents will suggest themselves to those skilled in the art.

What is claimed is:
1. In an automatic logging system for repetitive sequential recording of each of a plurality of information signals on a single chart comprising, a chart recorder of the type having a moveable chart, a meter with an indicator at said chart, means for causing said indicator to make mark impressions on said chart at positions corresponding to the intensity of information signals at said meter; a plurality of information signal transducers, each adapted for coupling to an associated signal source and creating an output information signal identifying the information of the signal from said associated source for recording on said chart; a stepper switch having at least three terminal banks with a moveable contact arm in each of said terminal banks coupled together to simultaneously contact the corresponding terminal in each of said banks; means coupling the output of each of said transducers to a corresponding terminal in each of two of said terminal banks; an amplifier having an input and output terminals; means coupling the moveable contact arms of said two terminal banks to the input terminals of said amplifier; means coupling the output terminals of said amplifier to said meter; power operated timing means adapted for coupling to a power source and said chart recorder for driving said chart at a preselected speed and including a timing cam; means in responsive relation to said timing cam and in control relation to said mark impression causing means for effecting intermittent mark impressions by said indicator on said chart; stepper switch indexing means in responsive relation to said timing cam for causing each of said contact arms to index to the next adjacent terminal in each of said terminal banks after each successive mark impression on said chart; and recycling means coupled to said third bank and arranged for indexing said contact arms to the first terminal after the terminal in said banks following the terminal coupled to the last of said transducer coupling means has been reached by the associated contact arm.

2. The combination as in claim 1 having additionally a fourth bank of terminals and moveable contact arm coupled to operate in unison with said three terminal banks and contact arms; an electric lamp circuit for each of said transducers coupled to a corresponding terminal of said fourth terminal bank and said fourth contact arm for luminously identifying the particular terminal of said banks being engaged by said contact arms as of any instant.

3. A structure according to claim 1 wherein said amplifier is a chopper stabilized amplifier.

References Cited by the Examiner
UNITED STATES PATENTS

| | | | |
|---|---|---|---|
| 807,774 | 12/1905 | Rasehorn | 346—34 |
| 2,484,734 | 10/1949 | Rahmel | 346—37 |
| 2,575,711 | 11/1951 | Hipple et al. | 346—33 |
| 2,657,376 | 10/1953 | McAdam. | |
| 2,858,475 | 10/1958 | Blake. | |
| 3,161,456 | 12/1964 | Perlaky | 346—34 X |

RICHARD B. WILKINSON, *Primary Examiner.*

J. W. HARTARY, *Assistant Examiner.*